(12) United States Patent
Park

(10) Patent No.: US 11,891,109 B2
(45) Date of Patent: Feb. 6, 2024

(54) STEERING COLUMN OF VEHICLE

(71) Applicant: HL MANDO CORPORATION, Pyeongtaek-si (KR)

(72) Inventor: Sunghun Park, Anyang-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 0 days.

(21) Appl. No.: 17/413,511

(22) PCT Filed: Dec. 12, 2019

(86) PCT No.: PCT/KR2019/017590
§ 371 (c)(1),
(2) Date: Jun. 11, 2021

(87) PCT Pub. No.: WO2020/122633
PCT Pub. Date: Jun. 18, 2020

(65) Prior Publication Data
US 2022/0048555 A1 Feb. 17, 2022

(30) Foreign Application Priority Data
Dec. 14, 2018 (KR) .................. 10-2018-0162292

(51) Int. Cl.
*B62D 1/184* (2006.01)
*B62D 1/19* (2006.01)
*B62D 1/187* (2006.01)

(52) U.S. Cl.
CPC ............ *B62D 1/184* (2013.01); *B62D 1/192* (2013.01); *B62D 1/195* (2013.01); *B62D 1/187* (2013.01)

(58) Field of Classification Search
CPC ........ B62D 1/184; B62D 1/192; B62D 1/195; B62D 1/194
See application file for complete search history.

(56) References Cited

U.S. PATENT DOCUMENTS 8,413,541 B2 * 4/2013 Davies ................... B62D 1/184
74/493
9,623,895 B2 * 4/2017 Johta ..................... B62D 1/187
(Continued)

FOREIGN PATENT DOCUMENTS

| CN | 104943728 A | 9/2015 |
|---|---|---|
| CN | 107226124 A | 10/2017 |

(Continued)

OTHER PUBLICATIONS

International Search Report dated Mar. 24, 2020, corresponding to International Application No. PCT/KR2019/017590.
(Continued)

*Primary Examiner* — Jason D Shanske
*Assistant Examiner* — Matthew James O'Neill
(74) *Attorney, Agent, or Firm* — Hauptman Ham, LLP

(57) ABSTRACT

According to the present embodiments, locking and unlocking can be smoothly performed even when gears for fixing a steering column during a telescoping operation of the steering column are not properly engaged, a collapse motion for absorbing impact can be smoothly performed even when a vehicle collision occurs in a state in which the gears are not properly engaged, impact is absorbed at the minimum and maximum of strokes so as to enable the prevention of noise generation during the telescoping operation, and the number of components can be reduced and assembly process can be simplified.

18 Claims, 15 Drawing Sheets

(56) References Cited

U.S. PATENT DOCUMENTS

| | | | |
|---|---|---|---|
| 10,035,479 B2* | 7/2018 | Orihara | B62D 1/192 |
| 2003/0172765 A1* | 9/2003 | Heiml | B62D 1/184 |
| | | | 280/775 |
| 2010/0300236 A1* | 12/2010 | Goulay | B62D 1/184 |
| | | | 74/493 |
| 2015/0266495 A1 | 9/2015 | Yoshihara et al. | |
| 2017/0274922 A1 | 9/2017 | Uesaka | |
| 2018/0057036 A1* | 3/2018 | Kim | B62D 1/184 |

FOREIGN PATENT DOCUMENTS

| | | |
|---|---|---|
| KR | 10-1101615 B1 | 1/2012 |
| KR | 10-2014-0019584 A | 2/2014 |
| KR | 10-2017-0121792 A | 11/2017 |
| KR | 10-2018-0088253 A | 8/2018 |

OTHER PUBLICATIONS

Office Action dated Feb. 11, 2023, for corresponding Chinese patent application No. 201980083142.X (10 pages).

* cited by examiner

STEERING COLUMN OF VEHICLE

CROSS-REFERENCE TO RELATED APPLICATION

The present application is a national stage filing under 35 U.S.C. § 371 of PCT application number PCT/KR2019/017590 filed on Dec. 12, 2019 which is based upon and claims the benefit of priorities to Korean Patent Application No. 10-2018-0162292 filed on Dec. 14, 2018, in the Korean Intellectual Property Office. Both of the aforementioned applications are hereby incorporated by reference in their entireties.

TECHNICAL FIELD

The present embodiments relate to a steering column of a vehicle, and more specifically, to a steering column of a vehicle that may enable a seamless locking and unlocking even when the gear fastening the steering column is not properly engaged when the steering column telescopes, smooth collapse motion for absorbing shocks even when the vehicle collides, with the gear not properly engaged, prevent noise by absorbing shocks at the minimum and maximum strokes upon telescoping, and allow for a reduction in the number of parts and simplified assembly.

BACKGROUND ART

In general, the steering column of a vehicle comes with telescoping and tilting features by which the driver may adjust the protrusion and tilt angle of the steering wheel to fit his height or body shape to enable smooth steering.

There is also provided a shock absorbing mechanism by which the steering column and the steering shaft contract in the axial direction to absorb shocks to thereby prevent the driver from hitting his chest on the steering wheel when the vehicle crashes.

By the conventional steering column, the driver unlocks the movable gear from the fixed gear of each of the telescope gear unit and the tilt gear unit by turning the lever and adjust the protrusion and tilt to a desired degree and angle so as to telescope and tilt the steering column and then turns the lever back to lock and engage the movable gear to the fixed gear. Unless properly engaged, the fixed gear and the movable gear are not locked although the driver turns the lever.

If the driver forcedly turns the lever when the fixed gear and the movable gear are not properly engaged, damage may be caused to the lever or the gear teeth of the fixed gear and the movable gear.

If a vehicle crash occurs while driving without proper engagement between the fixed gear and the movable gear, the steering column is not fastened, and collapse motion for absorbing shocks may not work. Thus, crash performance may be deteriorated.

DISCLOSURE

Technical Problem

The present embodiments have been conceived in light of the foregoing background and aim to enable a seamless locking and unlocking even when the gear fastening the steering column is not properly engaged when the steering column telescopes, smooth collapse motion for absorbing shocks even when the vehicle collides, with the gear not properly engaged, prevent noise by absorbing shocks at the minimum and maximum strokes upon telescoping, and allow for a reduction in the number of parts and simplified assembly.

The objects of the present invention are not limited to the foregoing and other objects will be apparent to one of ordinary skill in the art from the following detailed description.

Technical Solution

According to the present embodiments, there may be provided a steering column of a vehicle, comprising an upper column having an outer circumferential surface to which a plate having a first gear is coupled, a lower column supported on the outer circumferential surface of the upper column, having a slit formed in an axial direction and allowing the plate to be inserted thereto, and having distance brackets provided on two opposite sides of the slit, the distance brackets having first insertion holes to which an adjustment bolt is inserted, a hollow tube member supported on an outer circumferential surface of the adjustment bolt and having a protrusion cam, a gear member having a second gear engaged with the first gear, a fixing member coupled to the distance brackets and covering the gear member, and an elastic member provided between the fixing member and the gear member to pressurize the gear member.

Advantageous Effects

According to the present embodiments, it is possible to enable a seamless locking and unlocking even when the gear fastening the steering column is not properly engaged when the steering column telescopes, smooth collapse motion for absorbing shocks even when the vehicle collides, with the gear not properly engaged, prevent noise by absorbing shocks at the minimum and maximum strokes upon telescoping, and allow for a reduction in the number of parts and simplified assembly.

MODE FOR INVENTION

Figure 1:
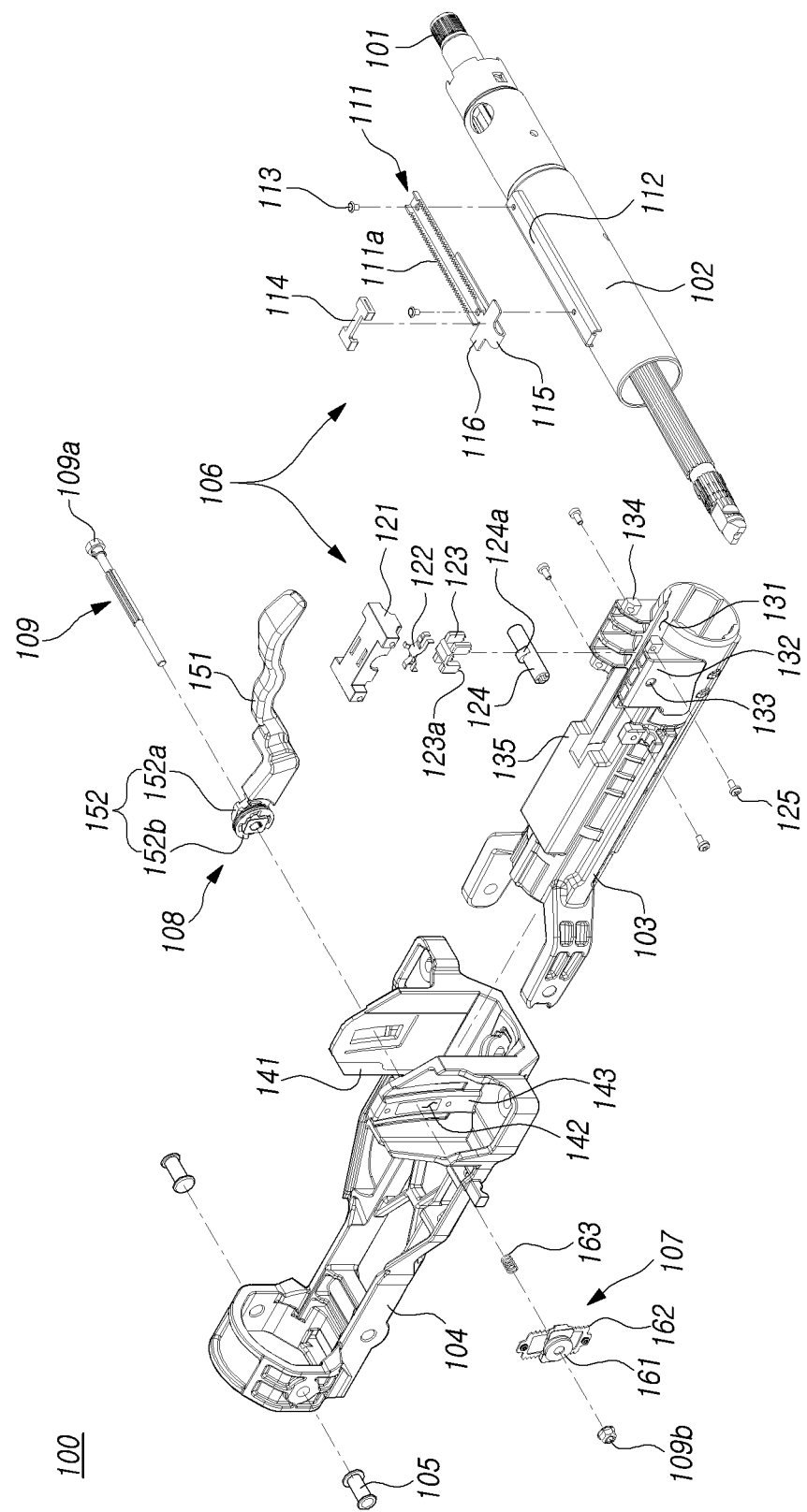
FIGS. 1 and 2 are exploded perspective views illustrating a steering column of a vehicle according to the present embodiments.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
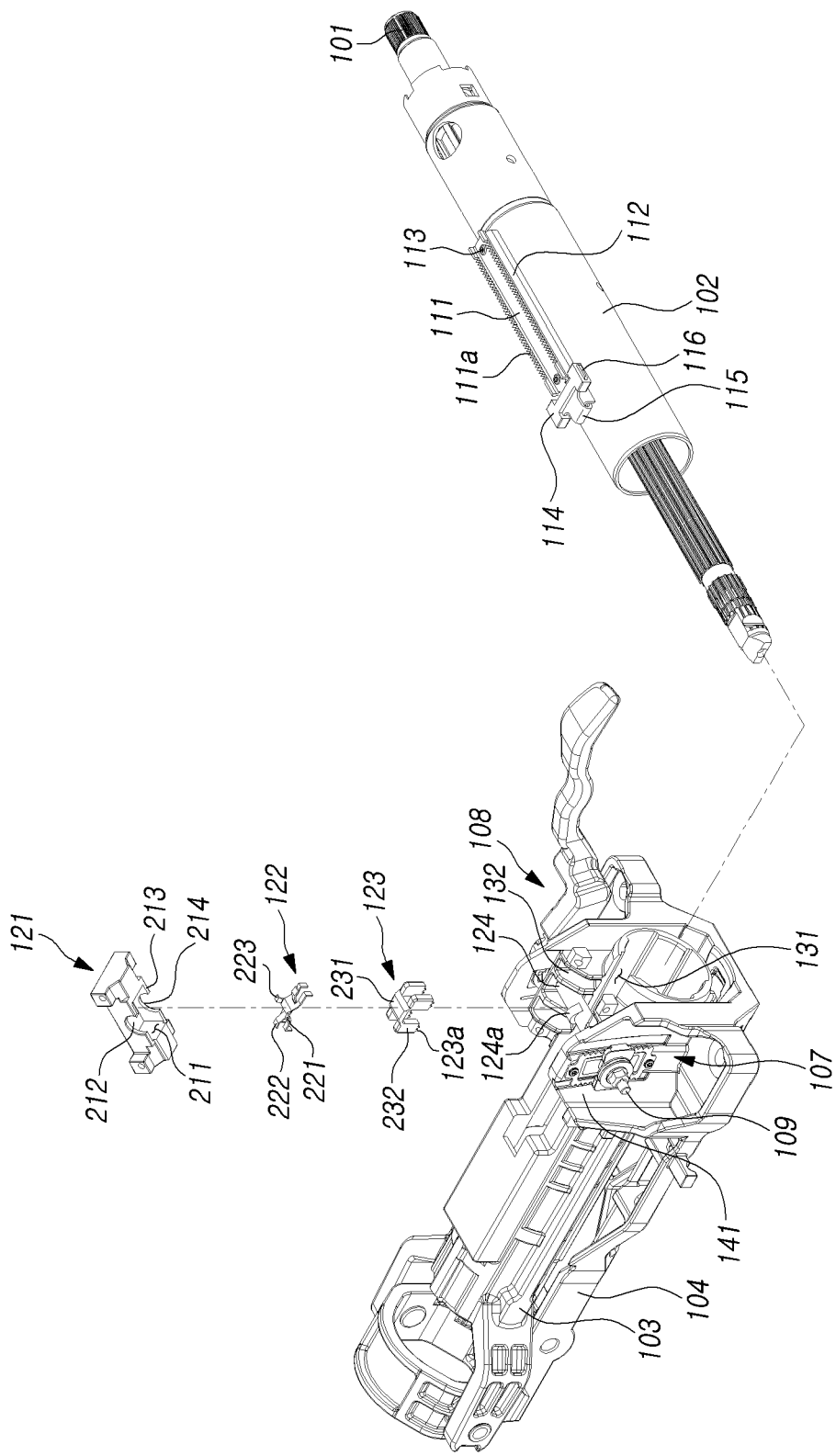
Figure 3:
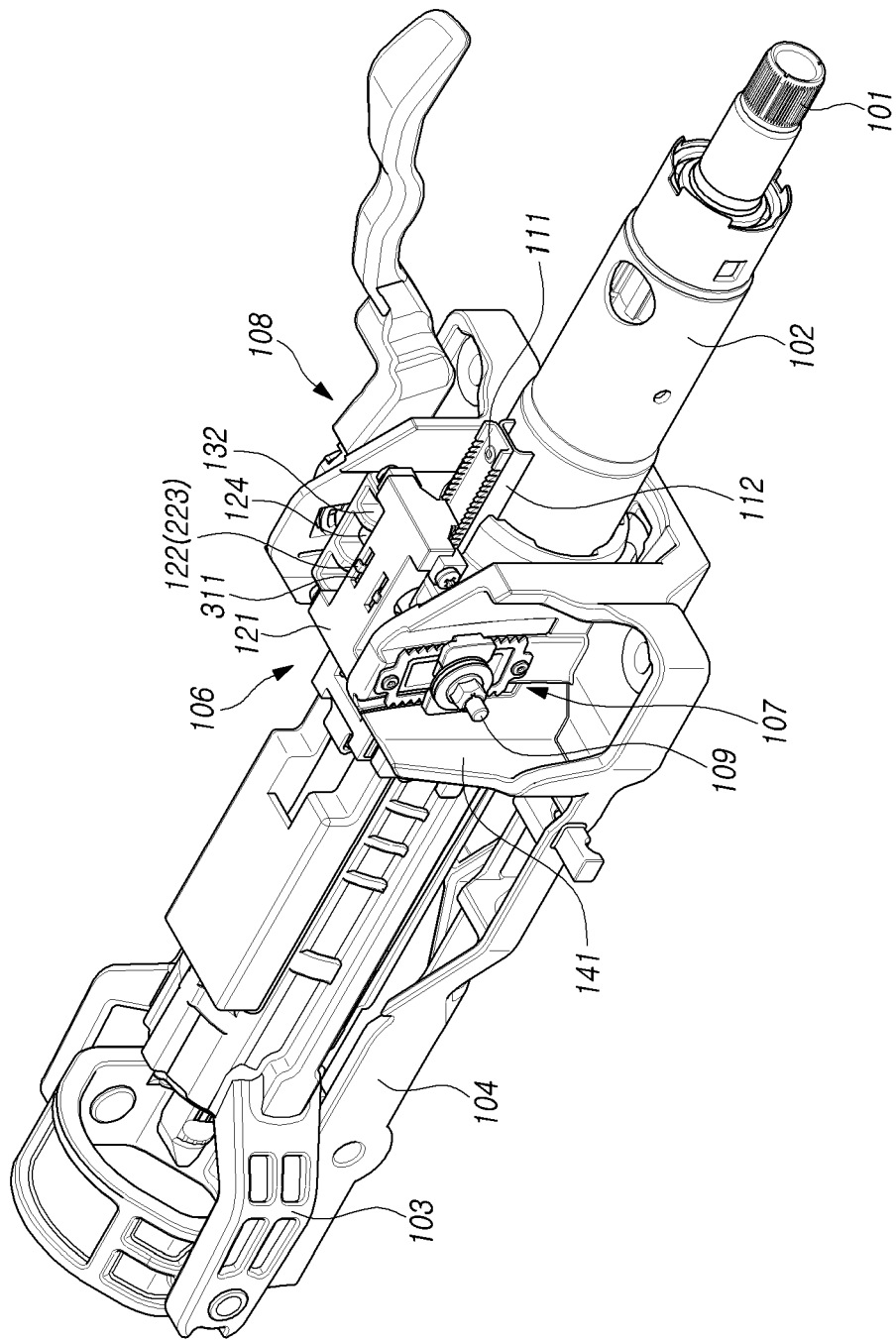
FIG. 3 is a perspective view illustrating an assembled state FIG. 1.
Figure 4:
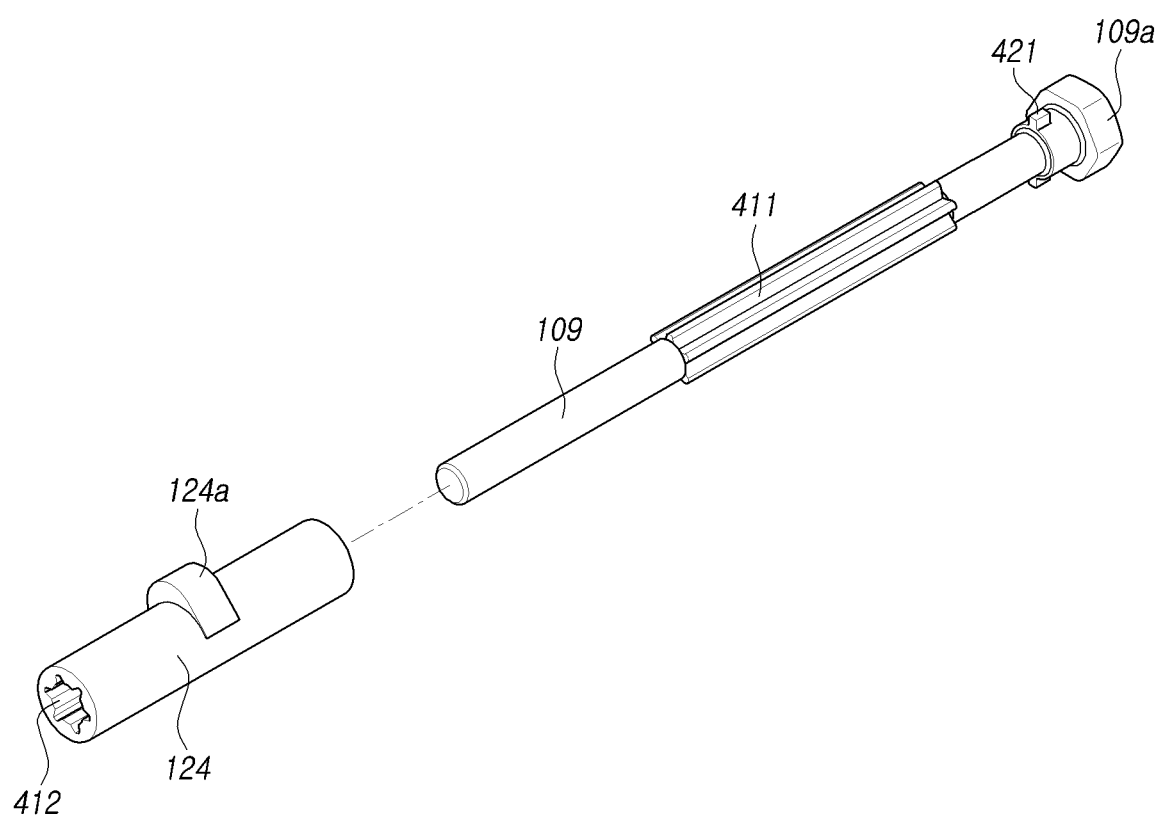
FIG. 4 is a perspective view illustrating a portion of FIG. 1.
Figure 5:
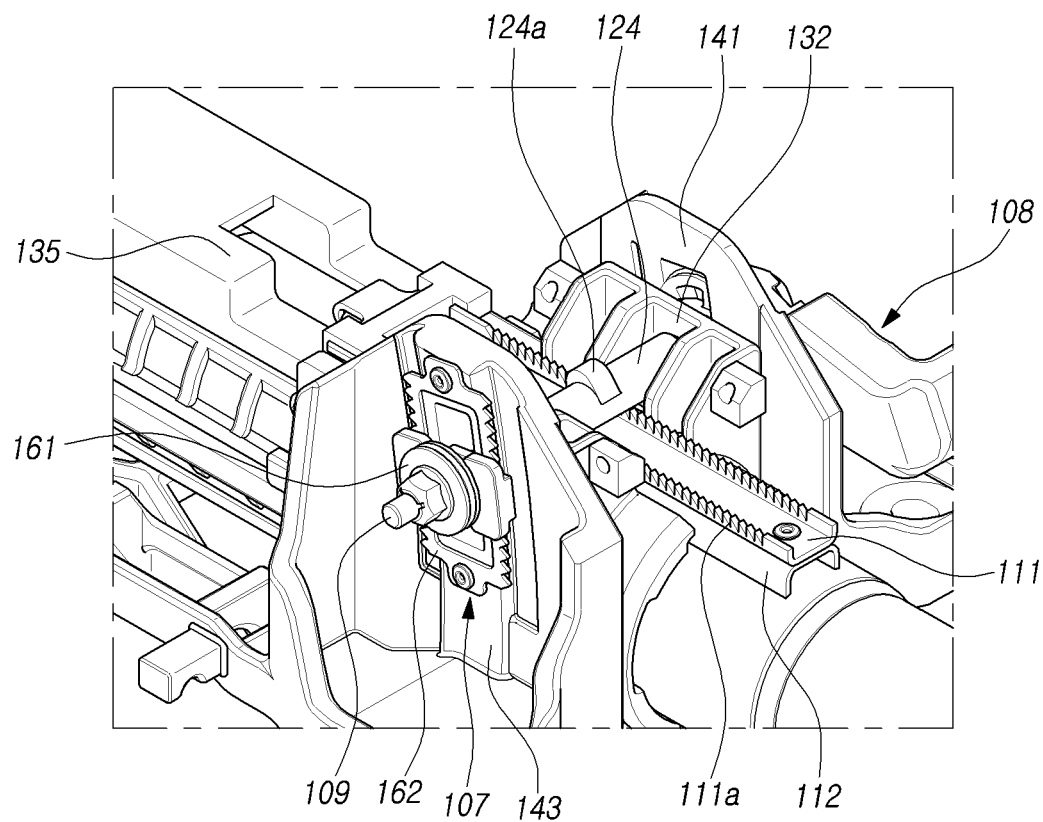
FIGS. 5 and 6 are perspective views illustrating a portion of FIG. 3.
Figure 6:
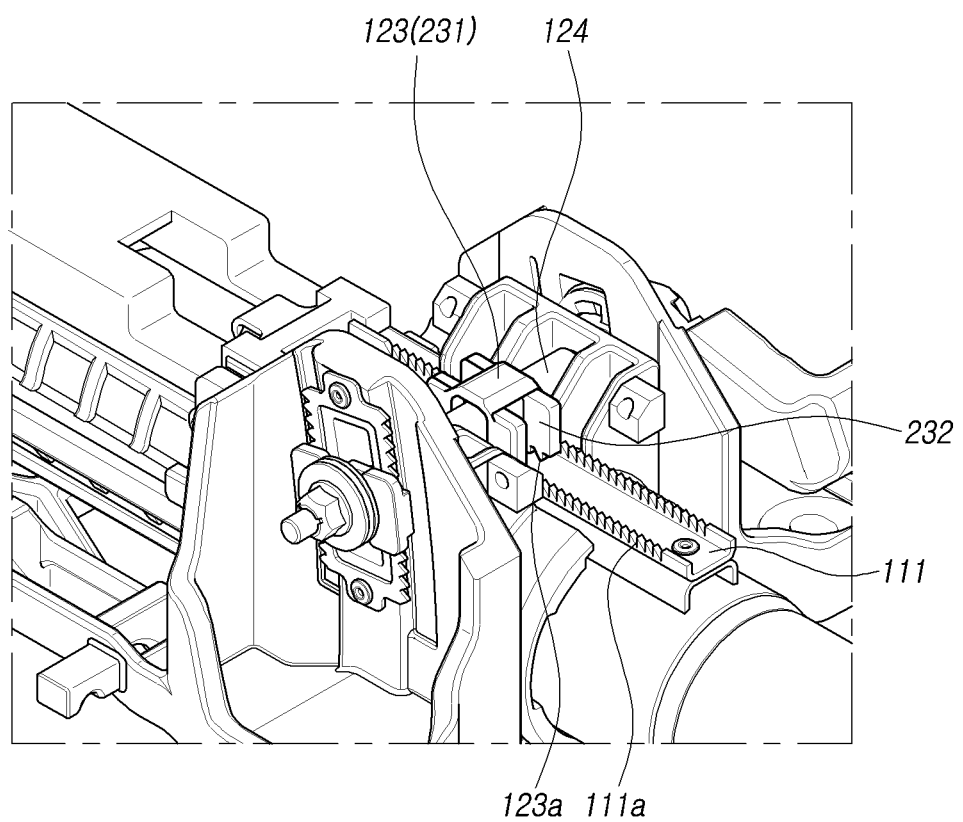
Figure 7:
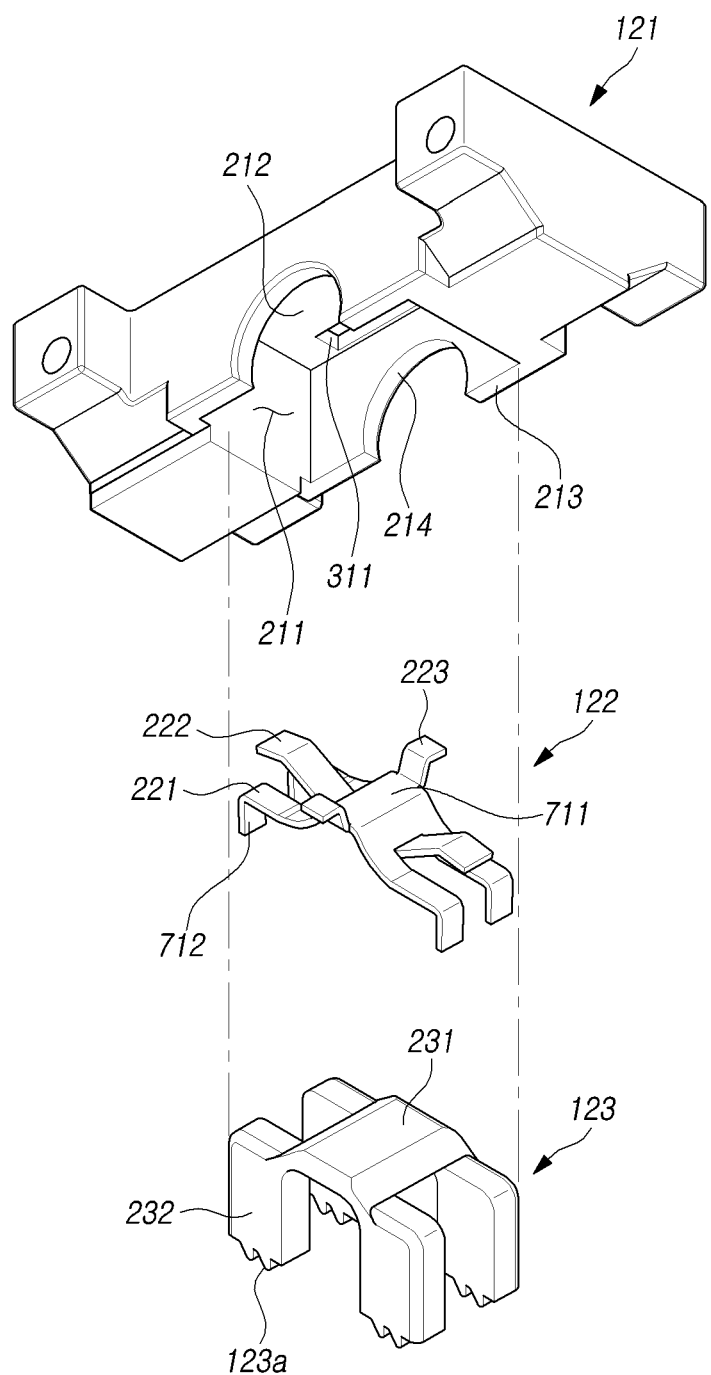
FIGS. 7 and 8 are perspective views illustrating a portion of FIG. 1.
Figure 8:
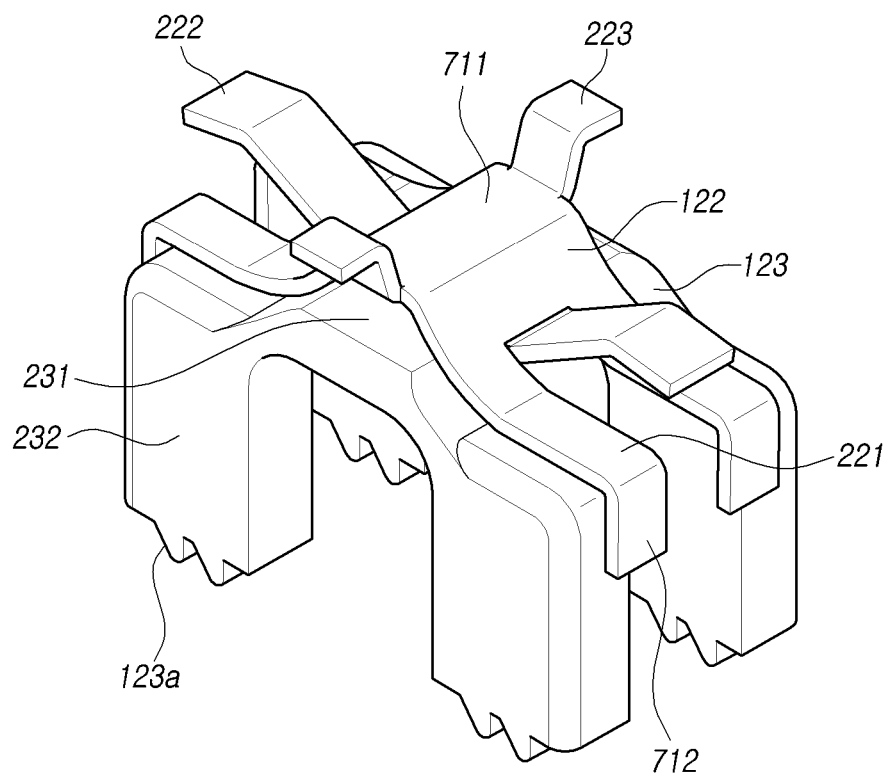
Figure 9:
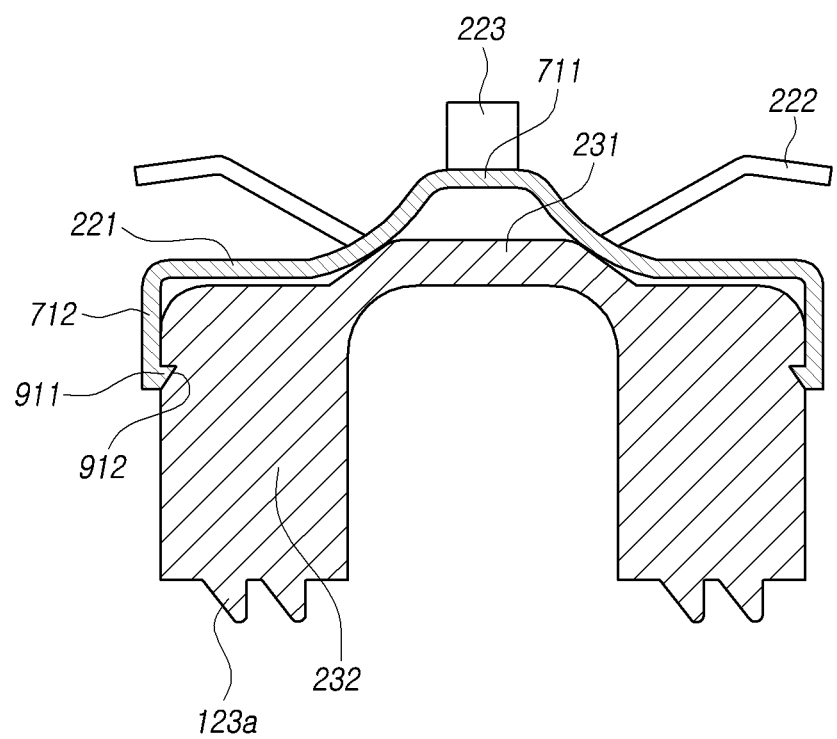
FIG. 9 is a cross-sectional view of FIG. 8.
Figure 10:
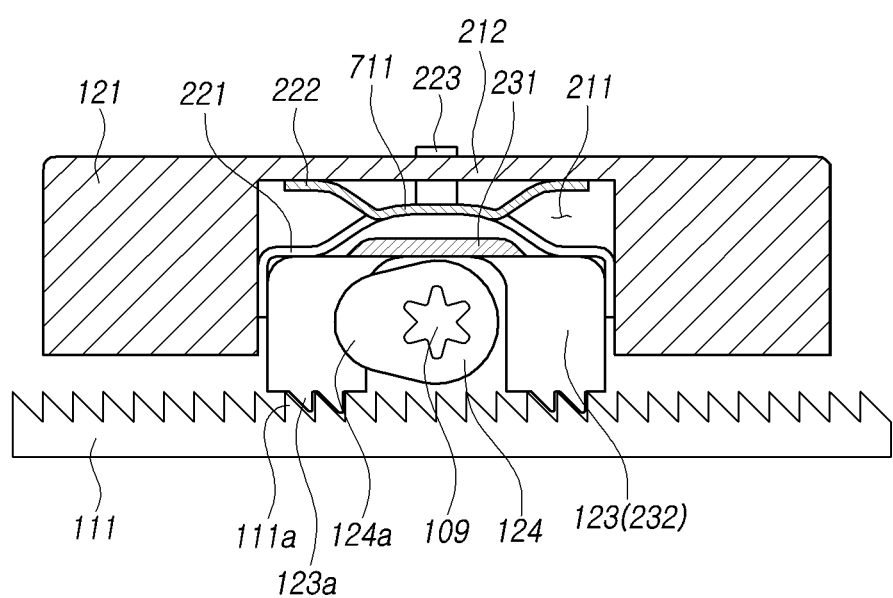
FIGS. 10 to 12 are cross-sectional views for an operating state of a portion of FIG. 3.
Figure 11:
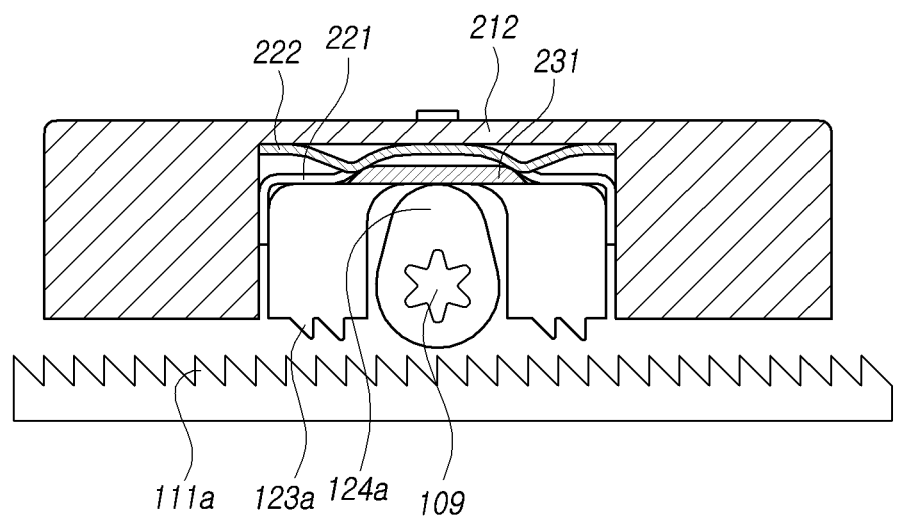
Figure 12:
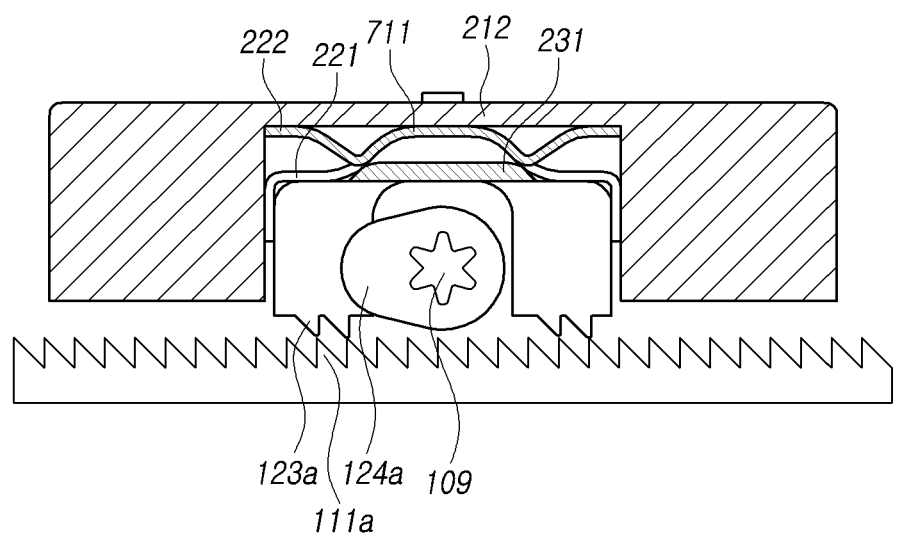
Figure 13:
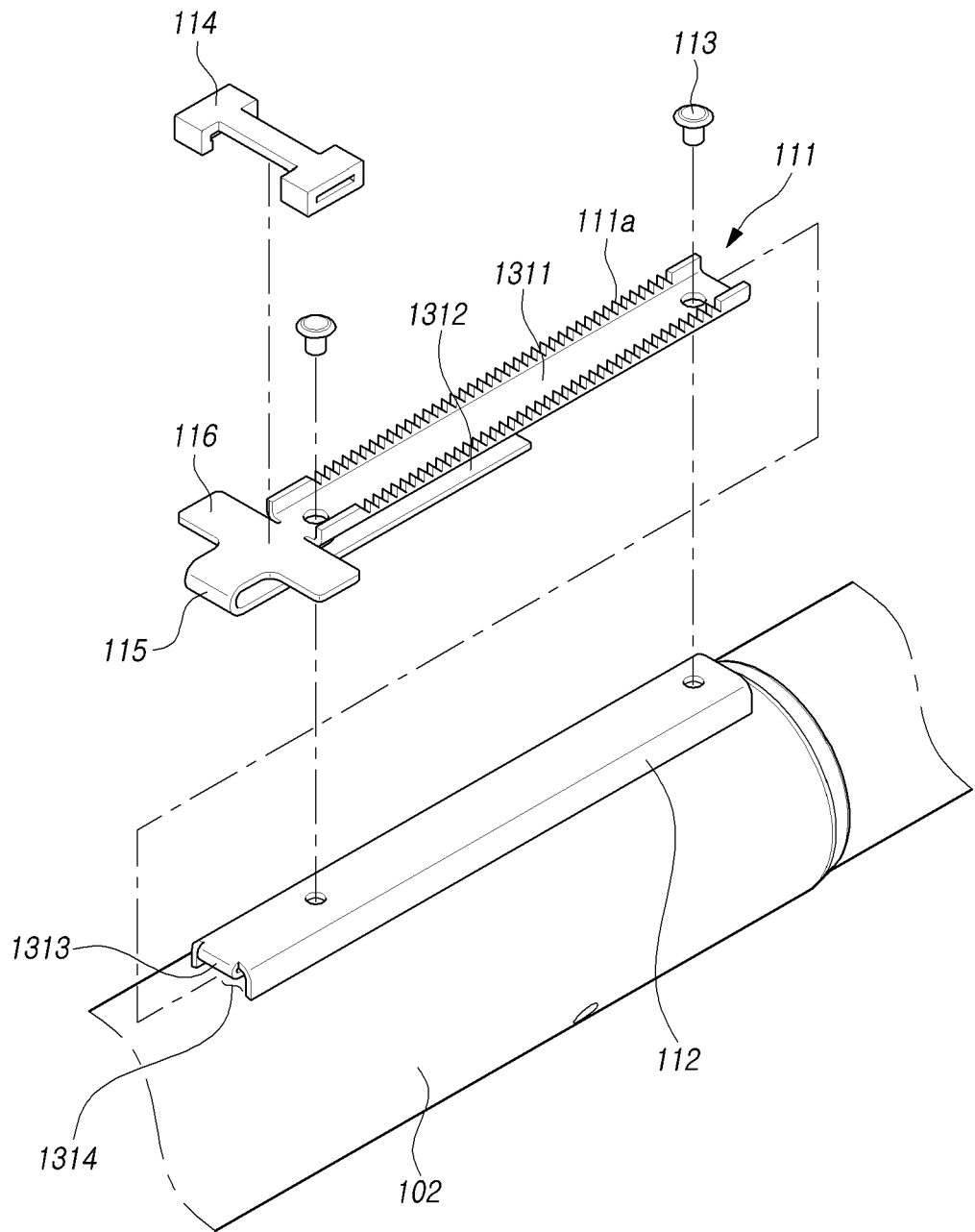
FIG. 13 is a perspective view illustrating a portion of FIG. 1.
Figure 14:
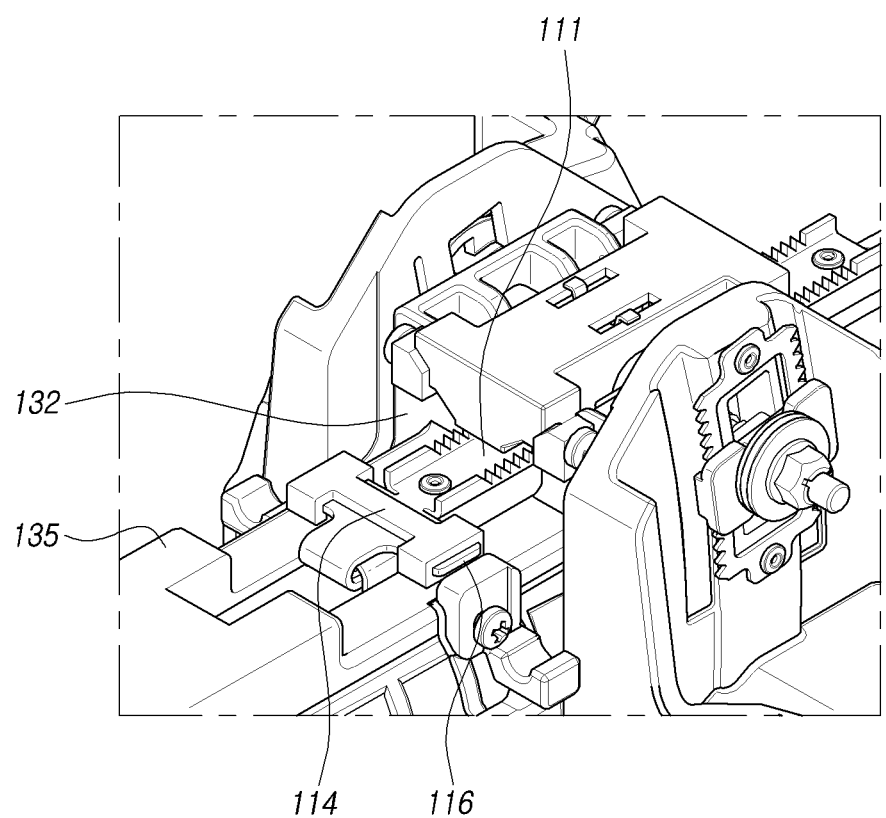
FIG. 14 is a perspective view illustrating a portion of FIG. 3.
Figure 15:
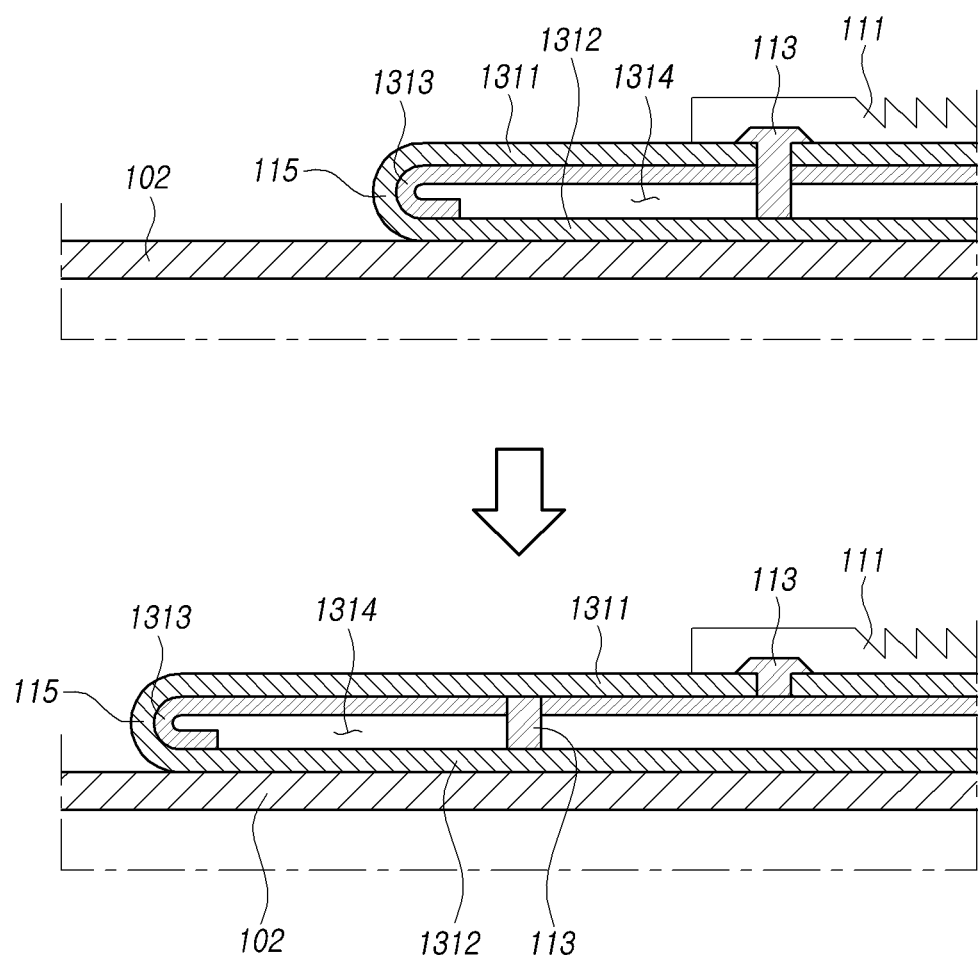
FIG. 15 is a cross-sectional view for an operating state of a portion of FIG. 3.

FIGS. 1 and 2 are exploded perspective views illustrating a steering column of a vehicle according to the present embodiments. FIG. 3 is a perspective view illustrating an assembled state FIG. 1. FIG. 4 is a perspective view illustrating a portion of FIG. 1. FIGS. 5 and 6 are perspective views illustrating a portion of FIG. 3. FIGS. 7 and 8 are perspective views illustrating a portion of FIG. 1. FIG. 9 is a cross-sectional view of FIG. 8. FIGS. 10 to 12 are cross-sectional views for an operating state of a portion of FIG. 3. FIG. 13 is a perspective view illustrating a portion of FIG. 1. FIG. 14 is a perspective view illustrating a portion of FIG. 3. FIG. 15 is a cross-sectional view for an operating state of a portion of FIG. 3.

A description is made below with reference to FIGS. 1 to 3.

According to the present embodiments, a steering column 100 of a vehicle includes an upper column 102 having an outer circumferential surface to which a plate 111 having a first gear 111a is coupled, a lower column 103 supported on the outer circumferential surface of the upper column 102, having a slit 131 formed in an axial direction and allowing the plate 111 to be inserted thereto, and having distance brackets 132 provided on two opposite sides of the slit 131, the distance brackets 132 having first insertion holes 133 to which an adjustment bolt 109 is inserted, a hollow tube member 124 supported on outer circumferential surface of the adjustment bolt 109 and having a protrusion cam 124a, a gear member 123 having a second gear 123a engaged with the first gear 111a, a fixing member 121 coupled to the distance brackets 132 and covering the gear member 123, and an elastic member 122 provided between the fixing member 121 and the gear member 123 to pressurize the gear member 123.

The upper column 102 and the lower column 103 are formed in a hollow shape so that the steering shaft 101 is inserted into the upper column, and the upper column 102 is inserted into the lower column 103 and may thus be slid along the axial direction and telescoped and collapsed by a telescope gear unit 106.

The lower column 103 is coupled with a mounting bracket 104 coupled to the vehicle body and supported on the vehicle. A rear end of the lower column 103 is coupled by a hinge member 105, and a front end of the lower column 103 is coupled by a tilt gear unit 107, so that tilting is possible.

The telescope gear unit 106 and the tilt gear unit 107 are locked or unlocked by the rotation of the adjustment bolt 109 that is rotated as the driver manipulates an adjustment lever 108.

In other words, the telescope gear unit 106 includes the plate 111, the tube member 124, the gear member 123, the fixing member 121, and the elastic member 122. The first gear 111a of the plate 111 and the second gear 123a of the gear member 123 are engaged or disengaged to perform telescoping.

The tilt gear unit 107 includes a fixed gear 162 and a movable gear 161, and the fixed gear 162 and the movable gear 161 are engaged and disengaged to perform tilting.

Although engagement between the gear teeth of the telescope gear unit 106 and the tilt gear unit 107 is not properly made, locking and unlocking may be smoothly performed, which is described below in detail.

The plate 111 having the first gear 111a is coupled to the upper column 102, and the plate 111 is elongated along the axial direction as illustrated in the drawings.

The plate 111 is coupled to a coupling bracket 112 by a coupling member 113, the coupling bracket 112 is coupled to the upper column 102, and upon collapsing, a bending portion 115 of the plate 111 is plastically deformed to absorb shocks. This is described below in detail.

The slit 131 is cut in the lower column along the axial direction and allows the plate 111 to be inserted thereto. In other words, an end of the slit 131, facing the upper column 102, is open and is elongated along the axial direction, so that the plate 111 is inserted to the slit 131 when the upper column 102 is inserted to the lower column 103.

Since the plate 111 and the coupling bracket 112 slide in the slit 131 upon telescoping and collapsing, the slit 131 is preferably formed to be longer than the plate 111 and the coupling bracket 112 considering the stroke of the upper column 102.

Further, the lower column 103 may have the distance brackets 132 provided on two opposite sides of the slit 131. The distance brackets 132 have the first insertion holes 133 through which the adjustment bolt 109 is inserted. In other words, the distance brackets 132 are provided to face each other, with the slit 131 disposed therebetween.

The mounting bracket 104 has plate brackets 141 supported on the outer surfaces of the distance brackets 132, and guide slits 142 are formed in the tilting direction in the plate brackets 141

The adjustment lever 108 includes a handle unit 151 and a cam gear 152. A first end of the adjustment bolt 109 is coupled with the cam gear 152, and the opposite, second end protrudes through the guide slit 142 and is coupled with the movable gear 161 of the tilt gear unit 107.

A head unit 109*a* is formed at either the first or second end of the adjustment bolt 109, and a nut 109*b* is coupled and fastened to the second end of the adjustment bolt 109. In the description of the present embodiments with reference to the drawings, the head unit 109*a* is provided at the end on the side of the adjustment lever 108, and the nut 109*b* is coupled to the end on the side of the tilt gear unit 107.

The cam gear 152 includes a first cam 152*a* rotated along with the handle unit 151 and a second cam 152*b* that has a first guide protrusion and slides along the guide slit 142. The first cam 152*a* and the second cam 152*b* have surfaces that are inclined in the circumferential direction and symmetrically face each other. The first cam 152*a* which is rotated as the driver manipulates the handle unit 151 rides up the inclined surface of the first cam 152*a* and moves away from the second cam 152*b*, or the first cam 152*a* rides down the first cam 152*a* and moves closer to the second cam 152*b*.

As a protrusion 421 is formed on the head unit 109*a*-side end of the adjustment bolt 109 (see FIG. 4), and the first cam 152*a* has a groove to which the protrusion 421 is inserted, the adjustment bolt 109 is fastened in the circumferential direction. Therefore, the adjustment bolt 109 rotates along with the first cam 152*a* and slides in the axial direction. In other words, if the first cam 152*a* gets closer to the second cam 152*b*, the adjustment bolt 109 rotates and advances to a side, and the plate 111 and the gear member 123, and the movable gear 161 and the fixed gear 162, are separated. If the first cam 152*a* moves away from the second cam 152*b*, the adjustment bolt 109 rotates and retreat to the opposite side, and the plate 111 and the gear member 123, and the movable gear 161 and the fixed gear 162, are engaged with each other.

In this case, a spring 163 may be provided between the movable gear 161 and the distance bracket 132 to provide an elastic force in the axial direction, so that the first cam 152*a* and the second cam 152*b* may be supported by each other without being spacing apart. Thus, when the driver manipulates the adjustment lever 108 in the unlocking direction, the adjustment bolt 109 may smoothly advance and, when the driver manipulates the adjustment lever 108 in the locking direction, the friction between the first cam 152*a* and the second cam 152*b* increases, allowing the driver better manipulation of the adjustment lever 108.

First, the operation of the tilt gear unit 107 is described. The fixed gear 162 includes a guide hole communicating with the guide slit 142 of the plate bracket 141 and fixed gear teeth formed on two opposite sides of the guide hole, and the movable gear 161 has a second guide protrusion inserted and slid to the guide hole and movable gear teeth.

In other words, the fixed gear teeth face outward in opposite directions, and the movable gear teeth are provided inward to face each other. As the adjustment bolt 109 advances, the spring 163 supports the movable gear 161 to move away from the distance bracket 132 so that the fixed gear teeth and the movable gear teeth are disengaged and, as the adjustment bolt 109 retreats, the nut 109*b* supports the fixed gear 162 in the axial direction so that the fixed gear teeth and the movable gear teeth are engaged with each other.

In this case, a protrusion surface 143 is formed on the surface where the fixed gear 162 of the plate bracket 141 is coupled. The fixed gear 162 is provided so that the fixed gear teeth depart outwards from the protrusion surface 143. Thus, although the fixed gear teeth and the movable gear teeth are not properly engaged when the driver manipulates the adjustment lever 108 in the locking direction, smooth locking may be achieved.

In other words, although the adjustment bolt 109 is retreated with the fixed gear teeth and the movable gear teeth axially supported and improperly engaged, the movable gear teeth axially pressurize the fixed gear teeth so that two opposite sides of the fixed gear 162 provided to depart outward of the protrusion surface 143 are bent. Thus, the adjustment bolt 109 may smoothly retreat.

When the adjustment lever 108 is manipulated back in the unlocking direction, the two opposite sides of the fixed gear 162, which have been bent, may be restored, and tilting is then performed.

Further, although a vehicle crash occurs with the fixed gear 162 and the movable gear 161 improperly engaged, if the impact load is transferred, the two opposite bent sides of the fixed gear 162 are restored while the fixed gear 162 and the movable gear 161 are engaged with each other.

Next, the operation of the telescope gear unit 106 is described. The gear member 123, the fixing member 121, and the elastic member 122 are provided between the distance brackets 132. The fixing member 121 is fixed to the distance bracket 132, and the elastic member 122 is provided between the gear member 123 and the fixing member 121. Although the drawings illustrate an example in which a screw coupling portion 134 is formed in the distance bracket 132, and the fixing member 121 is coupled to the screw coupling portion 134 via a bolt 125, embodiments of the disclosure are not limited thereto, they may be coupled by other coupling methods.

The gear member 123 is supported on a protrusion cam 124*a* of the tube member 124 and is operated as the tube member 124 rotates. The elastic member 122 includes first to third supporting portions 221, 222, and 223 and is coupled to the fixing member 121 and provides an elastic force towards the plate 111 of the gear member 123.

In other words, the elastic member 122 pressurizes the gear member 123 in the direction from the fixing member 121 to the plate 111. If the adjustment bolt 109 rotates to a side, the protrusion cam 124*a* is oriented towards the fixing member 121, the gear member 123 is separated from the plate 111, and the elastic member 122 is compressed. If the adjustment bolt 109 rotates to the opposite side, the protrusion cam 124*a* is oriented towards the plate 111, so that the elastic member 122 is expanded, and the gear member 123 is engaged to the plate 111.

Referring to FIG. 4, the tube member 124 is hollow and is supported on the outer circumferential surface of the adjustment bolt 109. In other words, a first serration 411 is formed on the outer circumferential surface of the adjustment bolt 109, and a second serration 412 is formed on the inner circumferential surface of the tube member 124, so that the tube member 124 is slidable in the axial direction and rotates along with the adjustment bolt 109.

In other words, when the adjustment bolt 109 advances or retreats while rotating as illustrated in FIG. 5, the tube member 124 may rotate along with the adjustment bolt 109 but be axially supported between the distance brackets 132, with the sliding distance limited, so that the protrusion cam 124a may be supported from escaping off the gear member 123.

Therefore, it is preferable that the tube member 124 is formed to be long enough to limit the axial sliding distance between the distance brackets 132 and that the protrusion cam 124a is formed in the center of the tube member 124.

Referring to FIG. 6, the gear member 123 includes a body portion 231 and a coupling portion 232. The body portion 231 is provided on the opposite side of the plate 111 to face the tube member 124, and the coupling portion 232 is formed to face in the direction from the body portion 231 to the plate 111 and is provided with the second gear 123a. In other words, the second gear 123a is provided on the face that is oriented towards the plate 111 of the coupling portion 232.

The body portion 231 is positioned on the opposite side of the plate 111 with respect to the tube member 124 and is supported on the protrusion cam 124a. In other words, the body portion 231 is supported as the protrusion cam 124a rotates to one side, or the gear member 123 is operated by the elastic force of the elastic member 122 as the protrusion cam 124a rotates to the opposite side.

Coupling portions 232 may be provided on two opposite sides of the body portion 231, with the tube member 124 disposed therebetween. In other words, the gear member 123 may be shaped to cover the opposite surface of the plate 111 of the tube member 124 and two opposite side surfaces in the width direction. As the coupling portions 232 are provided on both sides of the body portion 231, the gear member 123 may be moved balancedly without tilting to any one side when operating in the direction towards the plate 111 or the opposite direction.

Meanwhile, as the coupling portions 232 are provided on the two opposite sides of the tube member 124, the protrusion cam 124a is also provided between the coupling portions 232. To prevent the protrusion cam 124a from being stuck to the coupling portions 232 and thus restricted in rotation, the coupling portions 232 are provided on two opposite sides of the body portion 231 in the axial direction of the tube member 124 and be shaped to be spaced apart from each other.

To prevent the protrusion cam 124a from being stuck to the coupling portions 232, the coupling portions 232 may be formed on two opposite sides in the width direction of the tube member 124 to be spaced further apart than the degree of protrusion of the protrusion cam 124a, but it is preferable that the coupling portions 232 are spaced apart from each other considering, e.g., the size, weight, and assemblability of the gear member 123.

In other words, coupling portion 232 may be individually provided at each of the four corners of the body portion 231 to be spaced apart in the shape of a cross, so that the gear member 123 may be operated without tilting, and the protrusion cam 124a may be smoothly rotated.

Referring to FIG. 7, the gear member 123 and the elastic member 122 are supported on the fixing member 121 coupled to the distance brackets 132 as described above. The fixing member 121 may have a hollow portion 211 open towards the plate 111, and the gear member 123 and the elastic member 122 may be seated in the hollow portion 211.

In other words, the hollow portion 211 may be shaped substantially as a rectangular trench, so that the gear member 123 and the elastic member 122 may be supported in the axial direction and width direction of the tube member 124 and operated only towards the plate 111 or the fixing member 121.

As the hollow portion 211 is formed, the fixing member 121 is provided with side portions 213 supported on the gear member 123 in the axial direction of the tube member 124 and a rear portion 212 to which the elastic member 122 is coupled.

Meanwhile, the fixing member 121 may have second insertion holes 214 through which the adjustment bolt 109 and the tube member 124 are passed. In other words, the second insertion holes 214 communicate with the first insertion holes 133 and the portion between the coupling portions 232 formed in the side portions 213 and spaced apart in the width direction of the tube member 124.

The second insertion holes 214 may be formed to have a larger diameter than the tube member 124 to prevent friction when the tube member 124 rotates and be formed to be open towards the plate 111.

Referring to FIG. 8, the elastic member 122 has the first to third supporting portions 223 that are coupled to the fixing member 121 to elastically support towards the plate 111.

First, the first supporting portion 221 has two opposite ends supported on the coupling portions 232 and is formed to be bent towards a center portion 711 in the direction towards the fixing member 121.

In other words, as the center portion 711 of the first supporting portion 221 is positioned on the side of the body portion 231, and two opposite ends thereof are formed on the center portion 711 in the width direction of the tube member 124, the first supporting portion 221 is shaped to be supported on the coupling portions 232 and may be symmetrically formed when viewed in the axial direction, and as the portions between the center portion 711 and the two opposite ends are bent, an elastic force may be provided to the gear member 123 in the direction towards the plate 111.

Meanwhile, one of the first supporting portion 221 and the coupling portion 232 has a locking protrusion 911, and the other has a locking hole 912, so that the elastic member 122 and the gear member 123 may be coupled together.

Referring to FIG. 9, bends 712 towards the plate 111 may be formed at the ends of the first supporting portion 221. The locking protrusion 911 may be formed on one of the inner surface of the bend 712 and the side surface of the gear member 123 supported on the bend 712, and the locking hole 912 may be formed in the other. As the locking protrusion 911 and the locking hole 912 fit together, the elastic member 122 may be elastically supported without escaping off the gear member 123 when the gear member 123 is operated.

Next, the second supporting portion 222 is formed to be bent from the first supporting portion 221 to the fixing member 121 so that the ends thereof are supported on the inner surface of the fixing member 121.

In other words, the ends of the second supporting portion 222 are supported on the inner surface of the rear portion 212, and the second supporting portion 222 provides an elastic force towards the plate 111.

The second supporting portion 222 is formed from two opposite sides of the center portion 711 of the first supporting portion 221 in the axial direction, so that the elastic member 122 may be shaped substantially as the letter "X."

As the ends of the first supporting portion 221 are supported on the coupling portions 232, and the ends of the second supporting portion 222 are supported on the inner surface of the rear portion 212, the elastic force exerted by the elastic member 122 to the gear member 123 is increased.

As described below, the second supporting portion 222 may be compressed or expanded while the ends thereof are slid on the inner surface of the rear portion 212. The ends of the second supporting portion 222 may be bent to increase the area of contact with the rear portion 212 in order for the second supporting portion 222 to smoothly slide without interference.

The elastic member 122 may be coupled to the fixing member 121 by the third supporting portion 223 supported on the outer surface of the fixing member 121 (see FIG. 3).

In other words, the fixing member 121 may have a coupling hole 311 formed through the inner surface and the outer surface. The third supporting portion 223 is bent from the first supporting portion 221 towards the fixing member 121 so that the ends thereof are inserted to the coupling hole 311 and are supported on the outer surface of the fixing member 121.

As the coupling hole 311 is formed through the inner surface and outer surface of the rear portion 212 as illustrated in the drawings, the second supporting portion 222 is supported on the inner surface of the rear portion 212, the third supporting portion 223 is supported on the outer surface of the rear portion 212, and the elastic member 122 is coupled to the fixing member 121 by the elastic force of the second supporting portion 222 and the third supporting portion 223.

The ends of the third supporting portion 223 are bent and, when inserted and projected through the coupling hole 311, stuck to the outer surface of the rear portion 212 and thus prevented from escaping off the coupling hole 311.

The third supporting portion 223 may be formed on two opposite sides of the center portion 711 of the first supporting portion 221 in the width direction. In other words, the third supporting portion 223 may be formed in a direction perpendicular to the first supporting portion 221 and the second supporting portion 222. In this case, two coupling holes 311 spaced apart from each other so as to correspond to the third supporting portion 223 may be provided.

An embodiment in which the fixing member 121, the elastic member 122, and the gear member 123 are assembled together is described. First, the first supporting portion 221 is spread outwards and is supported on the gear member 123, and the locking protrusions 911 are fitted to the locking holes 912, and the first supporting portion 221 is restored by elastic force so that the elastic member 122 and the gear member 123 are coupled to each other.

Next, the third supporting portion 223 is retracted and inserted into the coupling hole 311, the second supporting portion 222 is supported on the inner surface of the rear portion 212, and the third supporting portion 223 is restored and supported on the outer surface of the rear portion 212, so that the elastic member 122 and the gear member 123 are coupled to the fixing member 121.

Then, the fixing member 121 having the elastic member 122 and the gear member 123 coupled thereto is coupled to the distance brackets 132 so that the gear member 123 is engaged with the plate 111 while covering the tube member 124.

The fixing member 121, the elastic member 122, and the gear member 123 are simply combined by the elastic force of the elastic member 122, and the combination is simply screwed to the lower column 103, and the telescope gear unit 106 may be assembled. Therefore, the number of parts may be reduced, and assembly may be simplified.

The operation of the gear member 123 and the tube member 124 is described below with reference to FIGS. 10 to 12.

The fixing member 121 is coupled and fastened to the distance brackets 132, the gear member 123 is operated in the upper and lower directions of the drawings by the protrusion cam 124a and the elastic member 122, and the gear member 123 is spaced apart from the plate 111 so that the upper column 102 is slid in the axial direction when the first gear 111a and the second gear 123a are disengaged to thereby perform telescopic motion.

Referring to FIG. 10, the adjustment lever 108 is manipulated in the locking direction so that the gear member 123 is engaged with the plate 111, and the elastic member 122 is expanded while providing an elastic force to the gear member 123 in the direction towards the plate 111.

Two opposite ends of the first supporting portion 221 are supported on the coupling portions 232, and the portions between the center portion 711 and the two opposite ends are spaced apart from the gear member 123, and the center portion 711 may be spaced apart between the inner surface of the rear portion 212 and the gear member 123.

The ends of the second supporting portion 222 may be supported on the inner surface of the rear portion 212 and are spaced apart to the left and right from the inner surface of the fixing member 121, and the third supporting portion 223 is inserted through the coupling hole 311 and supported on the outer surface of the rear portion 212.

Referring to FIG. 11, as the adjustment lever 108 is manipulated in the unlocking direction, the protrusion cam 124a is oriented towards the fixing member 121, and the gear member 123 is supported on the fixing member 121 by the degree of protrusion of the protrusion cam 124a so that the first gear 111a and the second gear 123a are disengaged, and the elastic member 122 is compressed.

The first supporting portion 221 may be compressed so that the center portion 711 may be supported on the inner surface of the rear portion 212, and the two opposite ends and the portions between the two opposite ends and the center portion 711 may be supported on the gear member 123.

As the elastic member 122 is compressed, the ends of the second supporting portion 222 may be slid on the inner surface of the rear portion 212 and supported to the left and right on the inner surface of the fixing member 121.

If the adjustment lever 108 is manipulated back in the locking direction after telescopic motion is done, the state illustrated in FIG. 10 is restored so that the first gear 111a and the second gear 123a are engaged with each other and fastened in the axial direction of the upper column 102 and the lower column 103.

However, when the gear member 123 is operated towards the plate 111, the state illustrated in FIG. 10 may not be restored, so that the first gear 111a and the second gear 123a may not be properly engaged. Even in such a case, the adjustment lever 108 may be manipulated in the locking direction.

Referring to FIG. 12, the teeth of the first gear 111a and the teeth of the second gear 123a are supported on each other, so that the gear member 123 fails to engage with the plate 111 despite the elastic force of the elastic member 122. However, since the protrusion cam 124a may escape off the gear member 123 and rotate, the tube member 124 and the adjustment bolt 109 may be rotated to the opposite side, so that the adjustment lever 108 may be manipulated in the locking direction.

If the adjustment lever 108 is manipulated back in the unlocking direction, the tube member 124 is rotated to allow the protrusion cam 124a to face the fixing member 121, and the gear member 123 is operated towards the fixing member 121, and the first gear 111a and the second gear 123a may be disengaged to perform telescopic motion.

In other words, although the fixed gear 162 and the movable gear 161 are not properly engaged with each other in the tilt gear unit 107 or although the plate 111 and the gear member 123 are not properly engaged with each other in the telescope gear unit 106, the adjustment lever 108 may be smoothly locked and unlocked.

Further, although a vehicle crash occurs with the plate 111 and the gear member 123 improperly engaged, if the impact load is transferred, the teeth of the first gear 111a and the second gear 123a are misaligned, and the gear member 123 is operated towards the plate 111 and engaged by the elastic force of the elastic member 122.

Thus, even when a vehicle crash occurs in the state where the upper column 102 is not fixed to the lower column 103 in the axial direction due to failure in proper engagement between the gears, the impact load is transferred, and the gears are rendered properly engaged, and the collapse motion for absorbing shocks may be smoothly operated as described below.

Meanwhile, the operating range of the telescope gear unit 106 needs to be limited to prevent the gear member 123 from escaping off the plate 111 in the axial direction while the telescopic motion is performed. To that end, a stopping portion 116 and a step portion 135 are provided.

Referring to FIG. 13, the stopping portion 116 protrudes in the width direction from the end of the plate 111, which faces the lower column 103. As illustrated in the drawings, stopping portions 116 may be individually provided on two opposite sides of the plate 111.

Referring to FIG. 14, the upper column 102 may have step portions 135 facing the distance brackets 132, with the stopping portion 116 disposed therebetween. In other words, the step portions 135 protrude in the diameter direction from the outer circumferential surface of the upper column 102 and are provided to face the distance brackets 132 in the axial direction.

Like the distance brackets 132, the step portions 135 may also be provided on two opposite sides of the slit 131 in the width direction. Thus, when the upper column 102 slides, the stopping portions 116 are supported on the distance brackets 132 or the step portions 135, restricting the operating range of the telescopic motion.

Further, a damping member 114 may be coupled to the stopping portions 116. The damping member 114 is provided to surround the stopping portions 116, absorbing impacts that are caused when the stopping portions 116 are supported on the distance brackets 132 or the step portions 135 and hence preventing noise. The damping member 114 may be formed of natural rubber or engineering plastics.

If the stopping portions 116 are individually provided on two opposite sides of the plate 111, the damping member 114 may include portions individually connected to the stopping portions 116 and a portion connecting them and may be integrally formed.

The integrally formed damping member 114 is expanded in the width direction of the plate 111 and is contracted by restoring force, and is coupled to the stopping portions 116 and thus prevented from escaping off the plate 111.

Meanwhile, the coupling bracket 112, the bending portion 115, a guiding portion 1313, and a space portion 1314 are provided to protect the driver by absorbing shocks when a vehicle crash occurs.

The plate 111 includes the first gear 111a and the bending portion 115, absorbing shocks when telescopic motion and collapse motion are performed. Thus, it is possible to reduce the number of parts and simplify the assembling process.

Referring to FIG. 13, the upper column 102 includes the coupling bracket 112. The plate 111 is coupled to the coupling bracket 112 by the coupling member 113.

The space portion 1314 is formed between the coupling bracket 112 and the outer circumferential surface of the upper column 102, and an end of the plate 111, which faces the lower column 103, is bent and inserted into the space portion 1314.

The coupling bracket 112 is elongated in the axial direction, and two opposite sides thereof in the width direction are bent and supported on the outer circumferential surface of the upper column 102. In other words, the coupling bracket 112 has a U-shaped cross section so that the space portion 1314, which is open in the axial direction, is formed between the outer circumferential surface of the upper column 102 and the coupling bracket 112.

The coupling bracket 112 may be integrally formed with the upper column 102 and be coupled to the upper column 102 by, e.g., welding.

The plate 111 extends from the portion, where the first gear 111a is formed, towards the lower column 103, forming the bending portion 115, and is bent and inserted into the space portion 1314.

In other words, an upper portion 1311, where the first gear 111a of the plate 111 is formed, is fastened to the coupling bracket 112 by the coupling member 113, and the bent lower portion 1312 is inserted into the space portion 1314.

Referring to FIG. 15, when a vehicle crash occurs, the upper column 102 slides in the axial direction, and the coupling bracket 112 plastically deforms the bending portion 115 of the plate 111, absorbing shocks and protecting the driver.

The upper portion 1311 of the plate 111 is engaged with the gear member 123. As described above, although the first gear 111a and the second gear 123a are not properly engaged, the impact load is transferred, and they are rendered to be engaged by the elastic force of the elastic member 122. The upper portion 1311 is fixed to the gear member 123 and is so fastened to the vehicle body although the upper column 102 slides.

If a car crash occurs, the coupling member 113 is ruptured by the impact load, and the coupling bracket 112 slides on the upper portion 1311, and the coupling bracket 112 plastically deforms the bending portion 115 while axially supporting the bending portion 115, allowing the plate 111 to absorb shocks.

In this case, for plastically deforming the bending portion 115 smoothly, the coupling bracket 112 may have the guiding portion 1313 that is supported along the inner surface of the bent portion of the plate 111.

In other words, the guiding portion 1313 is formed at the end of the coupling bracket 112, which faces the lower column 103, as illustrated in FIG. 15. The guiding portion 1313 is bent along the inner surface of the bending portion 115 so that an end thereof is inserted into the space portion 1314. Thus, when the coupling bracket 112 axially supports the bending portion 115, the lower portion 1312 is smoothly plastically deformed to the upper portion 1311 along the outer surface of the guiding portion 1313.

By the steering column of the vehicle shaped as such, it is possible to enable a seamless locking and unlocking even when the gear fastening the steering column is not properly engaged when the steering column telescopes, smooth collapse motion for absorbing shocks even when the vehicle collides, with the gear not properly engaged, prevent noise by absorbing shocks at the minimum and maximum strokes upon telescoping, and allow for a reduction in the number of parts and simplified assembly.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

As described above, Korean Patent Application No. 10-2018-0162292 filed on Dec. 14, 2018 is hereby incorporated by reference for all purposes as if fully set forth herein. In addition, if this patent application claims priority for countries other than the United States for the same reason as above, all the contents are incorporated into this patent application by reference.

The invention claimed is:

1. A steering column of a vehicle, comprising:
an upper column having an outer circumferential surface to which a plate having a first gear is coupled;
a lower column supported on the outer circumferential surface of the upper column, having a slit formed in an axial direction and allowing the plate to be inserted thereto, and having distance brackets provided on two opposite sides of the slit, the distance brackets having first insertion holes to which an adjustment bolt is inserted;
a hollow tube member supported on an outer circumferential surface of the adjustment bolt and having a protrusion cam;
a gear member having a second gear engaged with the first gear;
a fixing member coupled to the distance brackets and covering the gear member; and
an elastic member provided between the fixing member and the gear member to pressurize the gear member, wherein
the fixing member has a coupling hole formed through an inner surface and outer surface thereof, and
the elastic member includes an elastic supporting portion extending through the coupling hole and supported on the outer surface of the fixing member, and
wherein the elastic member is coupled to the fixing member by the elastic supporting portion.

2. The steering column of claim 1, wherein a first serration is formed on the outer circumferential surface of the adjustment bolt, and a second serration is formed on an inner circumferential surface of the hollow tube member.

3. The steering column of claim 1, wherein the gear member includes a body portion facing the hollow tube member, on an opposite side of the plate.

4. The steering column of claim 3, wherein the gear member includes coupling portions formed towards the plate from the body portion, and wherein the second gear is provided in the coupling portions.

5. The steering column of claim 4, wherein the coupling portions are provided on two opposite sides of the body portion, with the hollow tube member disposed therebetween.

6. The steering column of claim 5, wherein the coupling portions are provided on two opposite sides, in an axial direction, of the hollow tube member and spaced apart from each other.

7. The steering column of claim 5, wherein the fixing member includes a hollow portion open towards the plate, and wherein the gear member and the elastic member are seated in the hollow portion.

8. The steering column of claim 7, wherein the fixing member has a second insertion hole through which the adjustment bolt and the hollow tube member are passed.

9. The steering column of claim 7, wherein the elastic member includes a first elastic supporting portion that has two opposite ends supported on the coupling portions and a center portion bent towards the fixing member.

10. The steering column of claim 9, wherein one of the first elastic supporting portion and the coupling portions has a locking protrusion, and the other of the first elastic supporting portion and the coupling portions has a locking hole.

11. The steering column of claim 9, wherein the elastic member includes a second elastic supporting portion that is bent from the first elastic supporting portion towards the fixing member so that an end thereof is supported on an inner surface of the fixing member.

12. The steering column of claim 11, wherein the elastic supporting portion of the elastic member defines a third elastic supporting portion that is bent from the first elastic supporting portion towards the fixing member so that an end thereof is inserted into the coupling hole and is supported on the outer surface of the fixing member.

13. The steering column of claim 1, wherein stopping portions protrude, in a width direction, from an end, facing the lower column, of the plate.

14. The steering column of claim 13, wherein the upper column includes step portions facing the distance brackets, with the stopping portions disposed therebetween.

15. The steering column of claim 14, wherein a damping member is coupled to the stopping portions.

16. The steering column of claim 1, wherein the upper column includes a coupling bracket, and wherein the plate is coupled to the coupling bracket by a coupling member.

17. The steering column of claim 16, wherein a space portion is formed between the coupling bracket and an outer circumferential surface of the upper column, and wherein an end, facing the lower column, of the plate is bent and inserted into the space portion.

18. The steering column of claim 17, wherein the coupling bracket includes a guide portion supported along an inner surface of a bent portion of the plate.

* * * * *